Figure 4:
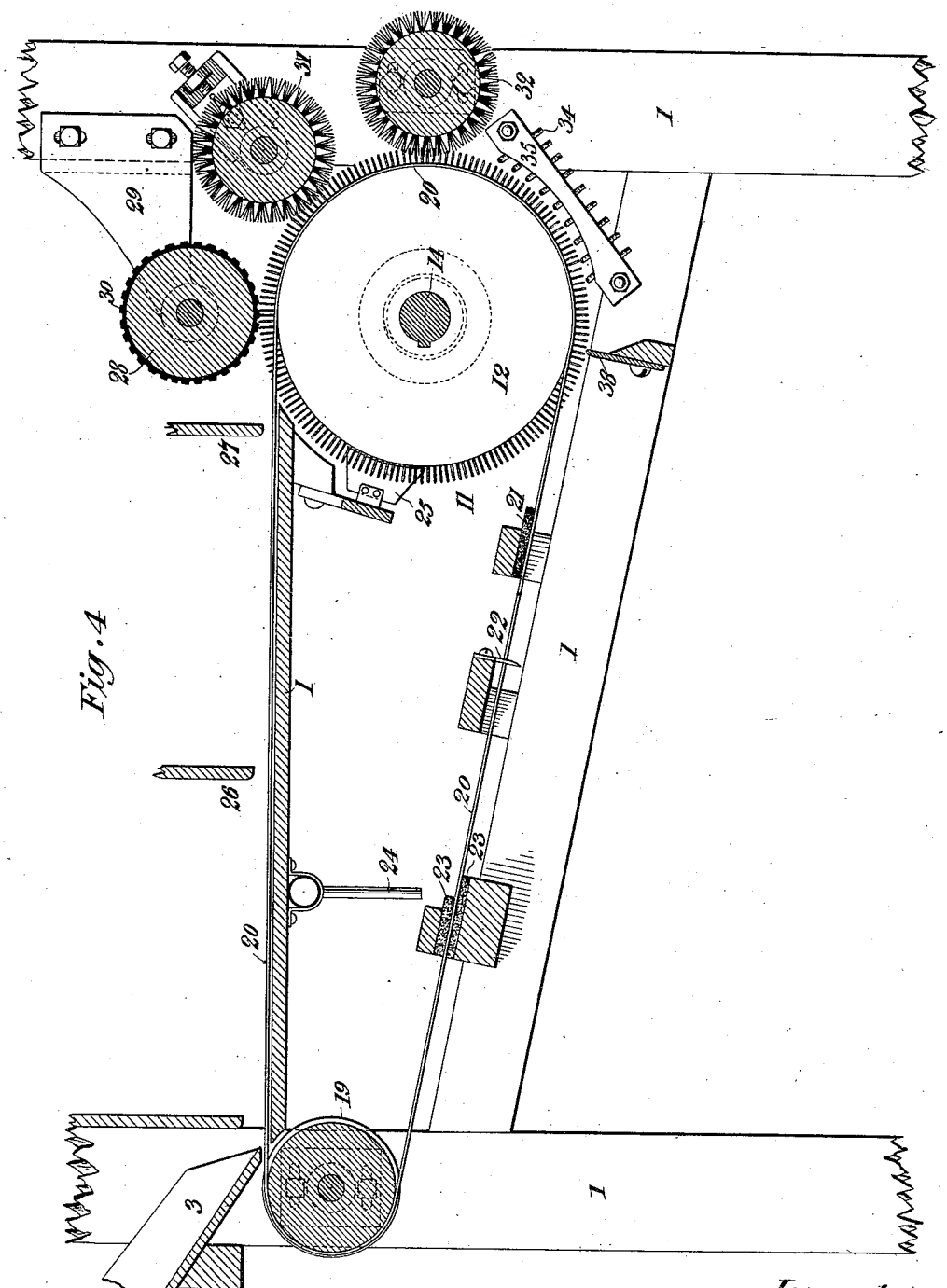

(No Model.) 4 Sheets—Sheet 1.
G. C. LA DUE.
MECHANISM FOR SEEDING FRUIT.
No. 543,833. Patented July 30, 1895.
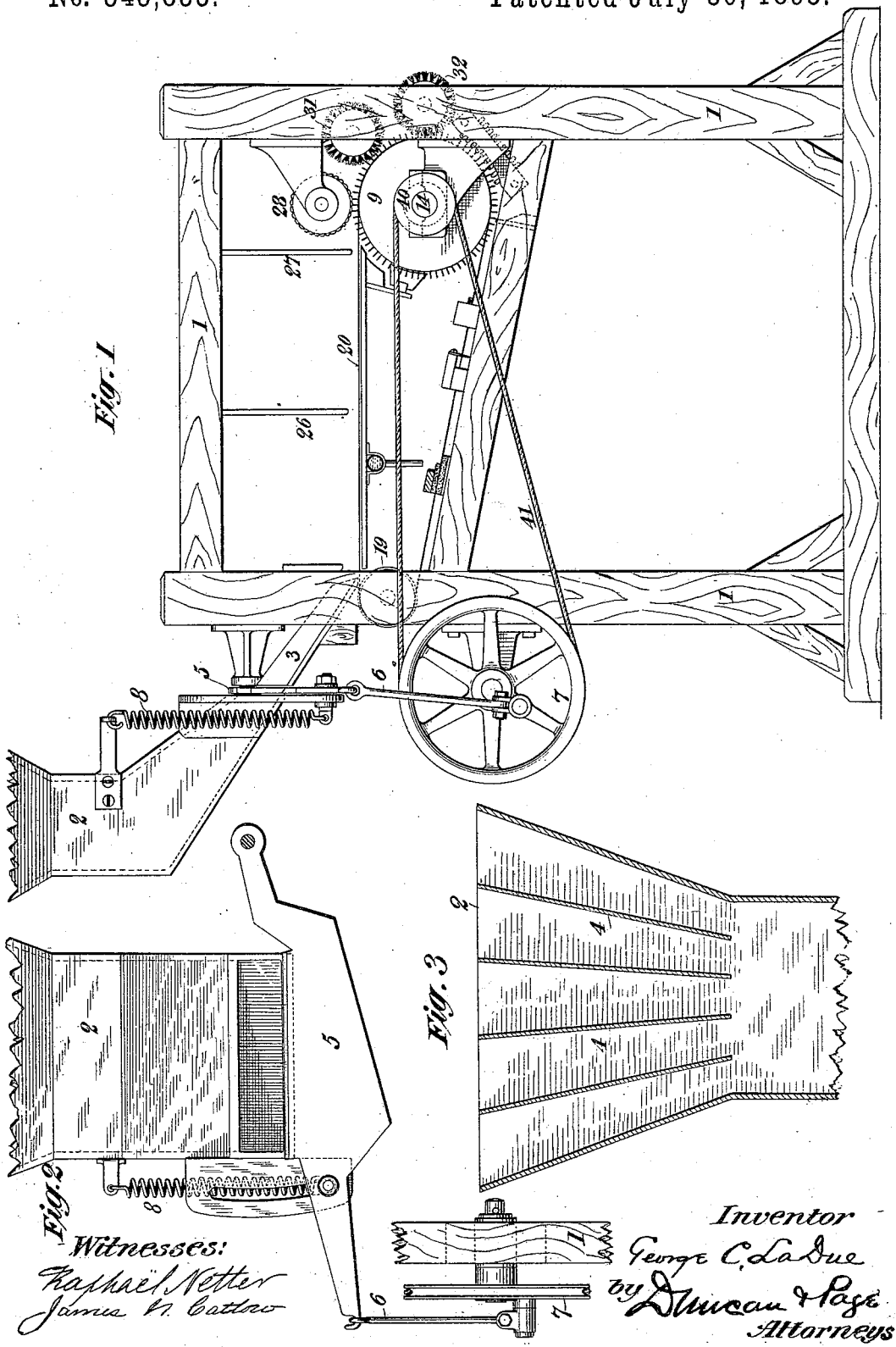
Witnesses:
Raphael Netter
James N. Catlow
Inventor
George C. La Due
by Duncan & Page
Attorneys (No Model.) 4 Sheets—Sheet 2.

G. C. LA DUE.
MECHANISM FOR SEEDING FRUIT.

No. 543,833. Patented July 30, 1895.

Witnesses:
Raphaël Netter
James N. Cattlow

Inventor
George C. La Due,
by Duncan & Page,
Attorneys (No Model.) 4 Sheets—Sheet 3.
G. C. LA DUE.
MECHANISM FOR SEEDING FRUIT.
No. 543,833. Patented July 30, 1895.
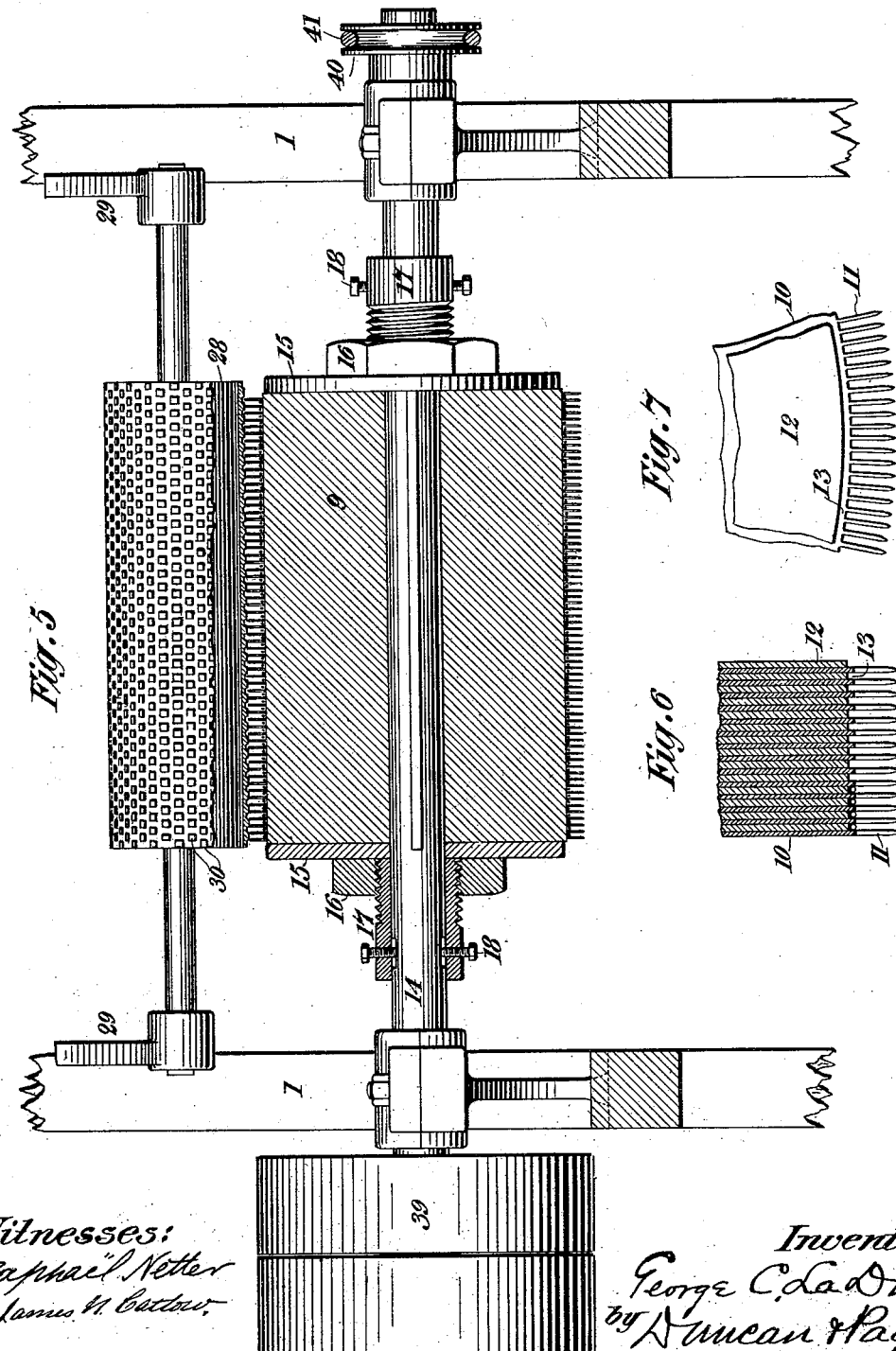
Witnesses:
Raphael Netter
James N. Catlow
Inventor
George C. La Due,
by Duncan & Page,
Attorneys.

(No Model.)  4 Sheets—Sheet 4.

G. C. LA DUE.
MECHANISM FOR SEEDING FRUIT.

No. 543,833. Patented July 30, 1895.

Witnesses:
Raphaël Netter
James N. Catlow

Inventor
George C. La Due,
by Duncan & Page,
Attorneys.

UNITED STATES PATENT OFFICE.

GEORGE C. LA DUE, OF BROOKLYN, NEW YORK, ASSIGNOR TO THE FRUIT CLEANING CO., OF SAME PLACE.

MECHANISM FOR SEEDING FRUIT.

SPECIFICATION forming part of Letters Patent No. 543,833, dated July 30, 1895.

Application filed September 17, 1894. Serial No. 523,224. (No model.)

*To all whom it may concern:*

Be it known that I, GEORGE C. LA DUE, a citizen of the United States, residing at Brooklyn, in the county of Kings and State of New York, have invented certain new and useful Improvements in Mechanism for Seeding Fruit, reference being had to the drawings accompanying the following specification and forming a part of the same.

The present invention relates to mechanism for removing the seed of fruit from the pulp or body thereof, especially dried fruit, such as raisins, currants, &c.

As an example or type of machine embodying my improvement, I shall describe a machine for extracting the seeds of raisins; but the principles of this machine are applicable to seeding other kinds of fruit.

It has been proposed to extract the seeds of raisins from the pulp or body thereof by forcing the raisins upon a surface of teeth or a series of teeth or points spaced so that when a raisin is impaled upon the same, especially by the action of a pressure-roll of soft material, the main body of the raisins will be forced between the teeth and the seeds thereof will be forced therefrom and into contact with the pressure-roll and be carried from the fruit by the roll. Other devices for removing the seeds from raisins by the act of impaling them have been proposed—such as a knife, die, plate, or comb—and it has been proposed to remove the seeded pulp from the impaling-teeth by a stationary comb or a series of fingers or stripping-blades against which the impaling-roll moves. Any such mechanism is inefficient to seeding raisins commensurate with commercial demands, especially in respect of quantity, economy, and quality of the seeded fruit. One difficulty is that the inevitable gumming of the working parts of the machine speedily effects the clogging and stopping of the same, which necessitates the non-use of the machine while its parts are being cleaned. A further objection is that the impaling and removing of the seeds by one action resulted in carrying away much of the pulp of the raisin, thus wasting the fruit. Another objection is that upon removing the seeded raisins from the impaling-teeth the raisins are more or less unevenly stripped, and by their adherence to the impaling-teeth become deformed and torn, so that they are more or less spoiled as to their salable quality.

In the process of removing the seeds of a raisin, which involves impaling it on a series of teeth or points spaced to receive the main body and pulp of the raisin and to exclude the seeds thereof, it is essential to the proper removal of the seed through the skin and the preservation of the seedless fruit in its original form and without waste of the skin or pulp thereof that the seed be not freed from the fruit by a single impaling action, but that the fruit be first impaled and the seed forced against the skin thereof to a greater or less extent; that then the skin of the fruit over the seed be punctured, ruptured, or broken, and be forced down around and off from the seed and upon the pulp, the action of impaling the fruit and engaging the seed being separate from or preceding the action of puncturing or rupturing the skin over the engaged seed preliminarily to the removal of the seeds from the fruit. Further, it is essential, especially in regard to not wasting the pulp of the fruit, that the seed expressed or forced from the fruit and sticking to the impaling-points be removed from said points and the main body of the fruit by mechanism acting to agitate, whisk, or similarly flip or flick the seed from contact with the pulp of the fruit, so that the seeds will not drag the pulp with them. Another essential is that the seedless fruit be evenly removed from the impaling-teeth or in such manner that the teeth will not disfigure or tear the same when the seeded body of the fruit is drawn or forced therefrom.

My invention relates to mechanism for carrying out the above-suggested steps of seeding fruit in substantially the manner indicated.

Figure 8:
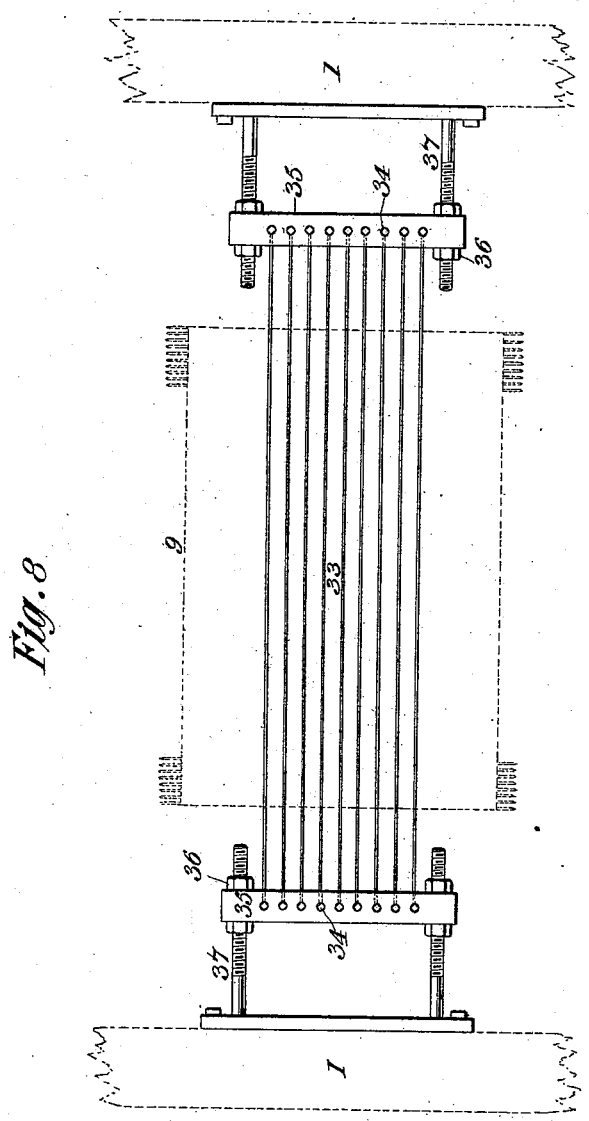
Figure 9:
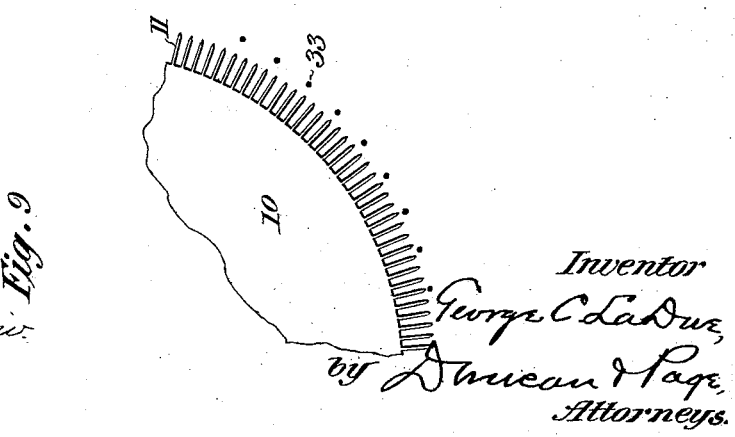

Figure 1 of the drawings is a side elevation view of one form of machine embodying my improvements. Figs. 2 and 3 are detail side and vertical sectional views of the hopper or feed mechanism of the machine. Fig. 4 is a central vertical section lengthwise of the machine on an enlarged scale. Fig. 5 is an enlarged central vertical section lengthwise of the receiving, carrying, or conveying roll, the covering of the impaling-roll being also shown in partial section. In this view the carrying-roll is sectioned as though it were a single solid piece, which it is not, because of the parts thereof being too small to show in this view in detail. Fig. 6 shows a similar section of the carrying-roll, the plates composing this roll being shown in detail; and Fig. 7 shows a like detail view of a cross-section of this roll. Fig. 8 is an enlarged elevation view in detail of the seed-removing mechanism from the right hand of Figs. 1 and 4, and Fig. 9 is a detail view showing the relative arrangement of this mechanism and the carrying-roll.

1 represents the framework and supporting parts of the machine.

2 is the hopper for receiving the raisins to be seeded, and 3 is the feed-trough leading to the machine. The hopper is divided by partitions 4 to break up and loosen the masses of raisins as they are fed into the hopper. The feed-trough is slotted across and contains the gate 5, pivotally supported at one end, the other end being connected by link 6 to a crank-pin on the pulley-wheel 7, so that with each revolution of said wheel the gate is opened and closed, a spring 8 assisting in this action.

9 indicates the raisin-carrying roll as a whole. This roll is composed of a series of circular plates 10, Figs. 6 and 7, which are regularly toothed at their peripheries 11, these teeth being practically square, but pointed at their ends. Between these toothed plates are arranged blank or spacing plates 12, of a thickness practically the same as that of the toothed plates and of a diameter less than that of the body part of the latter by an amount sufficient to form a three-sided continuous groove 13 of a depth equal to the thickness of the plates. Thus the teeth of the toothed plates are uniformly and regularly spaced, their separation being less than that of the smaller diameter of an average-sized raisin-seed. These plates are mounted upon and keyed to the main or driving shaft 14, and are bound together by the disk-heads 15, held to place by the nuts 16, threaded on the sleeves 17, which are adjustably secured to the shaft by the set-screws 18.

19 is a roll which is peripherally cut with grooves lying each in plane with one of the grooves 13 of the carrying-roll, and in these grooves, from one roll to the other, run a series of endless feeding and stripping wires or cords 20, the whole series constituting a feed-belt for carrying the raisins from the feed-trough of the hopper to and upon the carrying-roll. These wires are of uniform extent and size, and are drawn taut by positioning-roll 19, which is mounted in adjustable bearings, (see Fig. 4,) so that the wires are all tensely held parallel and in a common belt-like plane. The diameter of these wires is practically that of the breadth of the grooves 13, the outer surfaces of the wires being flush with the bottom walls of the spaces between the teeth at right angles to the wires. It will now be plain that as the rolls revolve the wires will move in and out from the impaling-teeth and will cleanly strip therefrom any adhering material, as a raisin that may have been pressed down upon the teeth, and in so stripping the teeth the whole body of the raisin is gradually and uniformly lifted, all the wires under the same moving together, so that the body of the raisin is not torn or cut; also, any of the pulp or gum that may adhere to the teeth, particularly in the paths of the wires, is stripped off, so that the grooves 13 are kept from gradually filling with the gum. This gum, or the pulp of the raisin, is the essential source of difficulty in running such a machine. The gum is apt to slowly collect in minute quantities and form into hard-caked masses that rapidly clog the machine. The collection of gum between the teeth in their circular plane is not so objectionable. It is the contact surfaces of the removing parts of the machine that must be kept free of accumulations.

In order to further insure the cleaning of the wires of collections thereon, the lower course of the same passes in contact with a sponge, felt block, or similar gum collecting and wiping device 21, arranged to bear with slight pressure upon the inner surfaces of the wires as they leave the carrying-roll; also, a comb 22 may be used, the teeth of which pass down between the wires and push off collections that may adhere between the surfaces of adjacent wires, and a two-part wiping device 23 may be used, and which acts upon the entire surface of each wire and is kept moistened by the water-drip nozzles 24. These cleaning devices are removably held in place, so that when they become loaded with collections they may be removed for cleansing and others substituted in their place. The conveying or feeding wires are thus kept free of collections that might pack in the wire-grooves of the rolls and displace the wires or strain and rupture them. These wires, being clean when they enter the grooves of the impaling-roll, tend to pick up and carry out any collections that may get into the grooves; but to make the clearing of these grooves more certain I also provide a series of scrapers 25, of thickness practically that of the grooves 13 and to the bottoms of which they extend, so as to catch any gum to which the round wires might not attach.

26 and 27 are distributers that serve to spread the raisins evenly over the feeding-belt, these distributers being arranged the former higher than the latter, so that the raisins are gradually spread out into a stream or layer of thickness practically that of one raisin.

28 indicates the impaling-roll, or the roll that preliminarily presses and partially impales the raisins on the teeth of the carrying-roll 9 as the feed-belt delivers the raisins between the two rollers. This roll is removably journaled in adjustable brackets 29, which are borne on the frame of the machine. The surface of this roll is composed of any suitably elastic material and may be corrugated or roughened, as by the teeth-like projections 30. This roll is to be adjusted so as to only slightly press the raisins upon the impaling-teeth of the carrying-roll, or to such extent that the teeth perforate the raisin and engage and press the seeds thereof toward or against the skin of the opposite side thereof.

31 is a brush-roll adjustably and removably supported in closer rotatable contact with the carrying-roll than is the impaling-roll. As the impaled raisins come under this roll the bristles or brush fibers puncture and partially displace the portions of the raisin-skin lying on the seeds. 32 is a similar roll set yet a little more closely to the carrying-roll, and which acts to slightly further force the fruit on the carrier-teeth and push or strip the punctured skin from off the outer surface of the seeds and to down over the sides thereof and upon the pulp already removed from the seeds. It is possible to substantially effect the actions of these two brush-rolls by the use of one; but experience indicates that the best results are obtained by having separate actions of opening the skin over the seeds and of then pushing it and the underlying pulp, if any, from contact with the upper surfaces of the seeds. After this step of the process the raisin-seeds will be found remaining on the impaling-teeth points, held in place by adherence to the pulp substance of the raisins. The seeds are removed by wires 33 stretched under considerable tension in front of the impaling-roll, as seen particularly in Figs. 8 and 9. These wires are secured to screws 34, which adjust the wires to and from the impaling-roll, and enter threaded holes in the draw-heads 35, which are adjustable to put the wires under tension by means of the nuts 36 and screw-rod supports 37. These wires are adjusted, as seen in Fig. 9, so that the first or upper one is at a distance from the impaling-teeth not greater, generally, than the thickness of a raisin-seed, the other wires being adjusted successively a little nearer, until the lower wire is reached and which very nearly touches the impaling-teeth. As the exposed seeds come in contact with these wires they are brushed off and drop away from the roll. It is to be noted that while the seeds are being so removed by their rolling from under the wire or being pushed off the wires are kept in vibratory motion, which tends to agitate or flick the seeds and so to loosen and remove them without tearing off the ruptured skin of the raisins or dragging out the pulp. Further, the wires offer small surface for the pulp or gum to adhere to and their vibration tends to flick off any gum that may adhere, and while the same is moist and least adhesive. These seed-removing wires are important to the successful operation of the machine, in that all forms of combs, knives, or plates afford extended surfaces to which the gum can adhere, and by collecting seeds would quickly form a clogging mass that would stop the machine or prevent its desired operation.

The further rotation of the carrying-roll brings the seeded raisins to the line where the wire belt begins to leave the roll, and as the belt-wires rise out from between the teeth the seeded raisins are lifted off the teeth evenly and in substantially their original form.

38 is a guard or stripper which engages and removes any seeds that may possibly adhere to the roll after the raisins have passed the seed-removing wires.

39 is the main driving-pulley on the main shaft, and pulley 40 on this shaft is connected by belt 41 to the pulley-wheel 7, that operates the gate in the hopper feed-trough.

The raisins are fed continuously to and through the machine; and with such a machine large quantities can be successfully handled and seeded. The various belt-wire-cleaning devices and the brush-rolls can be removed and washed if they become too much gummed, and other like parts be at once substituted, and thus the machine can practically be kept running any desired length of time, since the carrying-roll is kept cleaned or is prevented being gummed while in operation, as above set forth.

I do not herein claim broadly a mechanism for partially impaling the fruit on a series of spaced teeth, together with a mechanism acting to rupture the skin of the impaled fruit lying on the seed engaged by said teeth, the same forming the subject-matter of an application for Letters Patent filed by me on the 23d day of May, 1895, and bearing Serial No. 550,381.

What is claimed as new is—

1. In combination in a machine for seeding fruit, a roll carrier composed of a series of teeth spaced to engage and exclude the seeds of fruit impaled thereon, one or more rolls acting to impale the fruit upon the said teeth and to exclude the seed from the fruit, and vibrating mechanism acting to remove the exposed seed from the teeth of said carrier, substantially as set forth.

2. In combination in a machine for seeding fruit, a carrier having a surface of points or teeth spaced to exclude the seed of the fruit, mechanism for rupturing the skin in contact with the seeds and forcing the same over the seed, and one or more wires under tension arranged in close position to the carrier surface and adapted to act upon the seed of the fruit to remove the same from the carrier surface, substantially as set forth.

3. In combination in a machine for seeding fruit, a carrier having a surface of points or teeth spaced to exclude the seed of the fruit, a roll or rolls acting to rupture the skin in contact with the seeds and force the same from over the seeds, and a series of wires arranged successively in nearer position adjacent to the surface of the carrier and acting to remove the seed from the teeth of the same, substantially as set forth.

4. In combination in a machine for seeding fruit, a carrier composed of a series of teeth spaced to engage and exclude the seeds of the fruit impaled thereon, a roll or rolls acting to rupture the skin of the impaled fruit and remove the same from the seeds thereof, and a vibrating mechanism or device having motion relatively to the surface of the carrier and acting to remove the exposed seeds from contact with the impaled fruit on the carrier, substantially as set forth.

5. In combination in a machine for seeding fruit, a carrier roll composed of a series of teeth spaced to engage and exclude the seeds of the fruit impaled thereon, a roll or rolls for impaling the fruit upon the teeth of the said carrier with the seed of the fruit left upon the points of the same, and a series of wires arranged between the series of teeth of the carrier and extending substantially tangentially therefrom and acting to strip the seeded fruit from the teeth of the carrier, substantially as set forth.

6. In combination in a machine for seeding fruit, a carrier roll composed of a series of teeth spaced to engage and exclude the seeds of the fruit impaled thereon, a roll or rolls acting to impale the fruit upon the said teeth and exclude therefrom the seeds thereof, and a series of cords or wires located in the circumferential spaces between said teeth and held under tension and adapted to strip the seeded fruit from the teeth of the carrier, substantially as set forth.

7. In combination with a cylindrical carrier for receiving and conveying fruit, the surface of which is composed of a series of points or teeth spaced to exclude the seeds of fruit impaled thereon, a roll or rolls for impaling the fruit upon the teeth of the said carrier and excluding the seed therefrom, and a roll located adjacent said carrier, and endless cords or wires lying in circumferential grooves between the said series of teeth on the said carrier and passing over the said adjacent roll which act to feed the fruit to the carrier and remove the seeded fruit from the teeth thereof, substantially as set forth.

8. In combination with a cylindrical carrier for receiving and conveying fruit, the surface of which is composed of a series of points or teeth spaced to exclude the seeds of fruit impaled thereon, a roll or rolls for impaling the fruit upon the teeth of the said carrier and excluding the seeds therefrom, and a wire or wires having motion relatively to the surface of the carrier for removing therefrom the exposed seeds of the fruit, and a roll located adjacent said carrier, and endless cords or wires lying in circumferential grooves between the said series of teeth on the said carrier and passing over the said adjacent roll which act to feed the fruit to the carrier and remove the seeded fruit from the teeth thereof, substantially as set forth.

9. In combination in a machine for seeding fruit, a carrier roll composed of a series of teeth spaced to engage and exclude the seeds of fruit impaled thereon, a roll or rolls acting to impale the fruit upon the teeth of the said carrier and exclude the seed from the fruit, a roll located adjacent to said carrier roll, and a series of endless wires running over the said adjacent roll and the said carrier roll and acting to remove the impaled fruit from the latter, and removable sponge, felt or like cleaning devices arranged in the path of the said wires and acting to cleanse the same of the fruit substance adhering thereto, substantially as set forth.

10. In combination in the herein described machine for seeding fruit, the carrier roll 9 composed of the circular toothed plates 10 and the intermediate spacing plates 12, whereby the teeth of the former plates are circumferentially spaced, a roll or rolls acting to impale the fruit upon the toothed plates and thereby exclude the seed from the fruit, and cords or wires held between the said plates 10 and acting to strip the seeded fruit therefrom, substantially as set forth.

11. In combination in a machine for seeding fruit, a carrier composed of a series of teeth spaced to engage and exclude the seeds of fruit impaled thereon, one or more rolls acting to impale the fruit upon the teeth of the said carrier and exclude the seed therefrom, and an endless belt acting to deliver the fruit to the said rolls, and a distributer 27 located adjacent said belt and operating to distribute the fruit thereon in a layer of thickness corresponding to that of the fruit, substantially as set forth.

GEORGE C. LA DUE.

Witnesses:
ROBT. F. GAYLORD,
JAMES N. CATLOW.